United States Patent
Brodt et al.

(10) Patent No.: US 10,691,656 B2
(45) Date of Patent: *Jun. 23, 2020

(54) DELETING ROWS FROM TABLES IN A DATABASE WITHOUT AN INDEX

(71) Applicant: International Business Machines Corporation, Armonk, NY (US)

(72) Inventors: Andreas Brodt, Gerlingen (DE); Oliver Koeth, Stuttgart (DE); Daniel Martin, Stuttgart (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 798 days.

This patent is subject to a terminal disclaimer.

(21) Appl. No.: 15/355,233

(22) Filed: Nov. 18, 2016

(65) Prior Publication Data

US 2017/0075931 A1    Mar. 16, 2017

Related U.S. Application Data

(63) Continuation of application No. 14/851,047, filed on Sep. 11, 2015, now Pat. No. 10,380,086.

(51) Int. Cl.
*G06F 16/215* (2019.01)
*G06F 16/16* (2019.01)
*G06F 16/23* (2019.01)
*G06F 16/2455* (2019.01)

(52) U.S. Cl.
CPC ......... *G06F 16/215* (2019.01); *G06F 16/162* (2019.01); *G06F 16/235* (2019.01); *G06F 16/2322* (2019.01); *G06F 16/2365* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 8,407,242 B2 | 3/2013 | Jackson et al. | |
| 8,825,601 B2 | 9/2014 | Huynh Huu et al. | |
| 2006/0026154 A1 | 2/2006 | Altinel | |
| 2009/0299987 A1* | 12/2009 | Willson | G06F 16/254 |

(Continued)

OTHER PUBLICATIONS

Graefe, et al., "Self-selecting, self-tuning, incrementally optimized indexes", EDBT 2010, Mar. 22-26, 2010. pp. 371-381. Lausanne, Switzerland. Copyright 2010 ACM 978-1-60558-945-9/10/0003. 11 pages.

(Continued)

*Primary Examiner* — Amresh Singh
(74) *Attorney, Agent, or Firm* — Jay Wahlquist

(57) ABSTRACT

A method for deleting a row from a table in a database system comprises logically deleting the row in the first table in the database system by inserting a key of the row into a corresponding row of a dedicated table in the database system; querying the dedicated table during a query against the first table to identify the corresponding row in the dedicated table; and in response to identifying the corresponding row in the dedicated table, deleting the row from the first table and the corresponding row from the dedicated table as part of query processing during a subsequent query.

6 Claims, 5 Drawing Sheets

(56) References Cited

U.S. PATENT DOCUMENTS

2016/0283890 A1  9/2016 Diehl
2017/0075940 A1  3/2017 Brodt

OTHER PUBLICATIONS

Idreos, "Database Cracking: Towards Auto-tuning Database Kernels", Academic Thesis, University of Amsterdam, Jun. 24, 2010. 270 pages.
Idreos, et al., "Database Cracking", CIDR 2007. 11 pages.
Idreos, et al., "Updating a Cracked Database", SIGMOD'07, Jun. 11-14, 2007, Beijing, China. Copyright 2007. ACM 978-1-59593-686-8/07/0006. 12 pages.
Kersten, et al., "Cracking the Database Store", Proceedings of the 2005 CIDR Conference. 12 pages.
Neumann, et al., "x-RDF-3x: Fast Querying, High Update Rates, and Consistency for RDF Databases", Proceedings of the VLDB Endowment, vol. 3, No. 1, pp. 256-263. Copyright 2010 VLDB Endowment 2150-8097/10/09. 8 pages.
Shefrin, et al., "Lazy Deletion", Issue 2831, Computer Science Technical Report Series, University of Maryland, 1992. http://books.google.de/books/about/Lazy_Deletion_html?id=hOaipwAACAAJ&redir_esc=y Last printed Sep. 10, 2015. 1 page.
Benke, et al., "Efficient Full Delete Operations", U.S. Appl. No. 14/665,232, filed Mar. 23, 2015.
Brodt, et al., "Deleting Rows From Tables in a Database Without an Index", U.S. Appl. No. 14/851,047, filed Sep. 11, 2015.
List of IBM Patents or Patent Applications Treated as Related, Nov. 16, 2016. 2 pages.

* cited by examiner

DELETING ROWS FROM TABLES IN A DATABASE WITHOUT AN INDEX

BACKGROUND

Database systems that are specifically designed for analyzing very large amounts of data ("analytics workload") typically do not possess access paths that can address individual data rows efficiently. The only access path offered by most analytical database systems is a table scan. Such systems typically do not have indexes, as database systems targeting transactional workload typical implement them (e.g., B-Trees). This is because the typical analytical workload, at which they excel, hardly requires this and maintaining an index is expensive given the very large data sets which these systems address. As a consequence, retrieving an individual row, e.g., by its key columns, from a table may be as computationally "expensive" as retrieving all rows of the table. This is because there is no index to search for the location of the row in such systems. Hence, such a conventional system compares the search key with the key column of (potentially) all rows in the table.

As stated above, this is typically not a problem in analytical workloads that require mostly bulk processing, including when inserting and deleting rows. However, it can become a problem with the increasingly important requirement for real-time analytics. Real-time analytics often requires an analytical database to be synchronized with the operational database very frequently. Approaches such as loading or bulk-synchronizing the analytical database in coarse-grained time intervals typically do not meet the real-time analytics requirements as changes, such as inserted, updated, or deleted rows, in the operational database must find their way into the analytical database very quickly. This may lead to frequent inserts and deletes that only involve a small amount of individual rows. It may be noted that updates can be represented by inserting the modified rows and deleting the old rows. This is particularly a problem for any analytical system that may be updated frequently with a transactional database.

Inserting a row into a table without indexes is typically not a problem, as the new row is simply appended at the end. However, to delete an existing row, its storage location must be known. Without an index the storage location in such conventional systems is determined using a table scan, i.e., by looking at (potentially) all rows. If many rows are deleted from a table at once, the per-row cost may be acceptable. Yet deleting a single row comes at the per-row cost of a full table scan. If done frequently, this is not acceptable for very large tables as typically found in analytical databases.

It may also be noted that the same arguments as above apply for hybrid systems which store two copies of the data—e.g., in row-oriented fashion for transactional workloads and in column-oriented fashion for analytical workloads. For such systems, it may also become necessary to synchronize the two copies very frequently. Moreover, in many such systems, one data representation does not possess indexes. Column-oriented representations, for instance, are typically not indexed. In addition to that, it may be noted that both of the described bottlenecks may be independent of the storage representation, i.e., row-vs. column-oriented or other representations.

SUMMARY

According to one aspect, a method for deleting a row from a table in a database system is provided. The method comprises logically deleting the row in the first table in the database system by inserting a key of the row into a corresponding row of a dedicated table in the database system; querying the dedicated table during a query against the first table to identify the corresponding row in the dedicated table; and in response to identifying the corresponding row in the dedicated table, deleting the row from the first table and the corresponding row from the dedicated table as part of query processing during a subsequent query.

Furthermore, embodiments may take the form of a database system and a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It may be noted that the subsequent queries may not be dedicated to the row that has been deleted before. Any query involving the table may perform any deletions for any row—in particular those having corresponding rows in the dedicated table—in the table.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
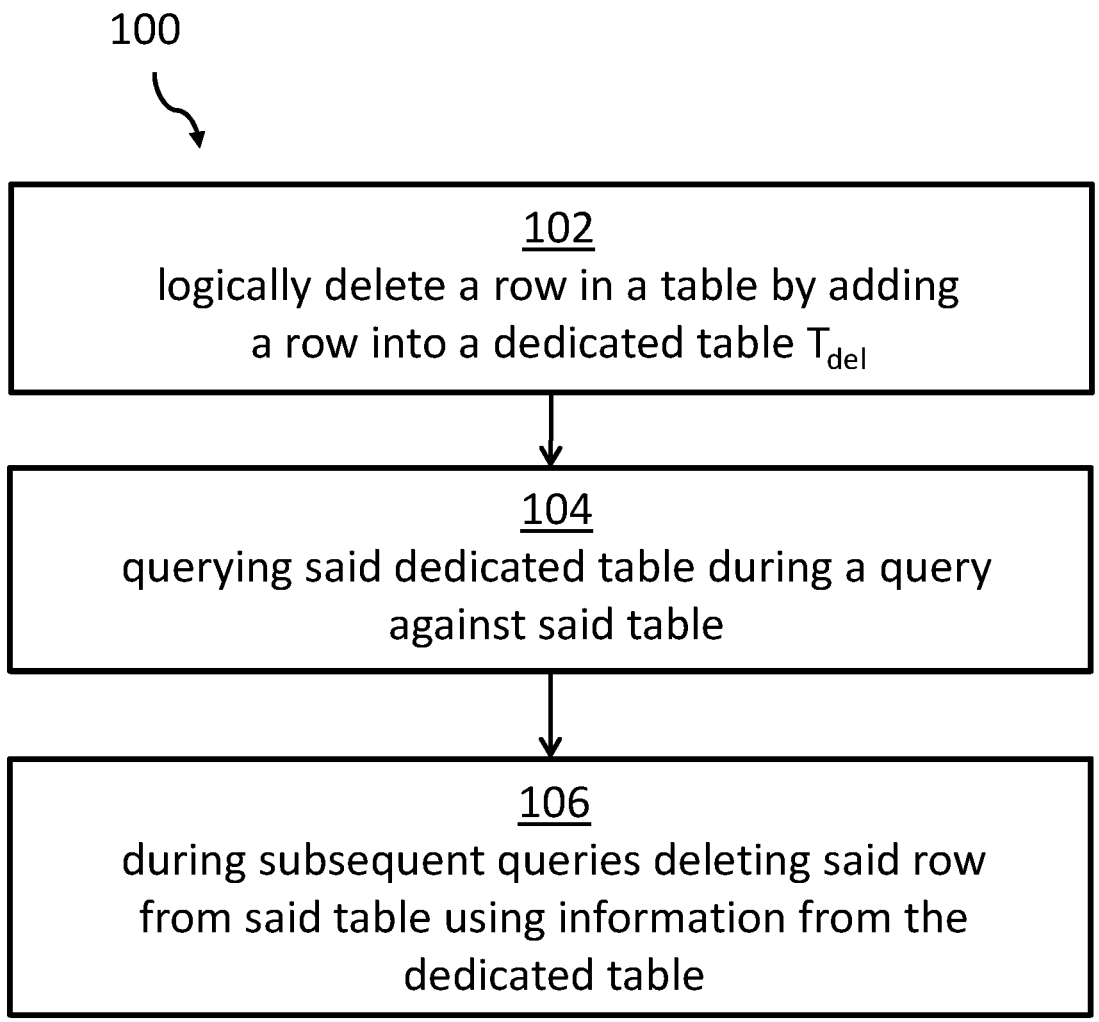
FIG. 1 shows a block diagram of an embodiment of one example of a method for deleting rows from tables in a database system.

In the context of this description, the following conventions, terms and/or expressions may be used:

The term 'database system' may denote a system for storing data. Today, typical database systems or database management systems are implemented as table-oriented relational databases. Although relational database systems are the most widely implemented method for storing data, also column oriented database systems gain ground, and the concepts proposed here may relate to both, and also database systems having a different organization.

The term 'tables', in particular tables in a database system, may denote and represent a relation comprising a defined set of attributes. Each relation in a table may represent a row or record.

The term 'key' may denote one or more of the attributes defining a row by which it may be identified. A key may be a unique key, also known as a primary key. A key may also be a secondary key meaning that such a key, which may be represented by a key attribute, may not be unique in a given table. A primary key may also be a combination of several secondary key attributes, e.g., $k_1, \ldots k_n$ which makes such a key unique and, thus, prime again.

The term 'without an index' may denote that for a table no additional index may be created. Indexes are also often kept as tables relating to the indexed table for speed up access to a row. One reason for using an index for a given table in a database system is in accessing specific rows in the table directly. No scan—worst-case through all rows of the table—may be required to directly access the specific row.

The term 'deleting'—and in particular deleting a row in a table of a database system—may denote removing physically or marking the row as deleted and leave it as part of the database table. For this purpose, in multi-version concurrency control systems (MVCC), each row may have as additional attributes a create timestamp here called "CreateTimeStamp" and a delete timestamp here called "DeleteTimeStamp". Typically, these timestamps are filled with transaction numbers indicative of a relative time related to a transaction. Thereby, it may be assumed, that transaction numbers are strictly monotonically increased.

The proposed method for deleting rows from tables in a database system may offer a couple of advantages and technical effects:

As discussed above, large database tables having no index imply high computing costs for deletions of single rows in such database tables. Therefore, embodiments of the method and related database system propose to append a row relating to the row to be deleted in the original database table. This can be performed comparably fast. It is not necessary to scan the complete table in which the row should be deleted at delete time. Instead, the deletion of the row in the table is performed during a subsequent read or several read operations after the deletion, such as while searching rows that have nothing to do with the deleted row. The read operations or queries may have nothing to do with the row to be deleted apart from involving the same database table. However, the effort to scan the database table can be used in addition to delete those rows in the table that have been marked to be deleted in a dedicated table or side-table. Thus, performance advantages can be gained for delete operations by modifying a query execution to expand that query command inside the database system.

The proposed method works independently of the way the data may be stored in the database system and the way a concurrency control of rows in a table is managed. The proposed method may also work successfully with all traditional database operations including rollback.

It may also work with database partitioning independent of the level of partitioning as well as multiple updates. Additionally, it is also possible to increase the speed of deletions of rows in the main table by allowing multiple parallel queries to perform delete operations based on corresponding rows in the dedicated table.

According to one embodiment of the method, the table may be without one or more indexes. This can imply that no direct access to a specific row in a table may be possible without searching or querying the complete table. Database tables for analytical purposes may typically be implemented without indexes, whereas database tables for transaction processing may often be implemented having access keys. Some advantages of the proposed method for deleting a row in a table of a database without indexes may be more significant than in tables with access keys. Tables with access keys may allow a direct access of a row or record in a table; thus a direct deletion may be faster. However, for tables without an access key, the row to be deleted has to be searched before an action like a delete operation may be performed.

According to one embodiment of the method, an update operation of a row in the table may be executed as one of deleting for the row and/or an additional subsequent insertion operation for a modified one of the row. An insertion may be a relatively fast operation because it may simply be performed by appending a new row to the table. However, the table may now have two versions of the same row—in particular with the same or modified key—with different create timestamps and no delete timestamp. A subsequent read operation to such double-rows may need to reflect the delete timestamp which may initially be present in a row of a side-table or table $T_{del}$ which may hold the deletion information of one of the two rows.

According to one embodiment of the method, each row in the table as well as each row in the dedicated table may comprise a create timestamp attribute and a delete timestamp attribute. In multi-version concurrency control (MVCC) systems, timestamps can be implemented as unique transaction numbers and can be assumed to be increased monotonically.

According to one embodiment of the method, the create timestamp attribute of a row in the dedicated table may hold the delete timestamp value of a corresponding delete operation of a row in the table. Thus, no real deletion—in particular modifying the row with a delete timestamp value—of the row in the table T may be required; instead an additional row in the table $T_{del}$ may be written or appended comprising a create timestamp attribute for the delete timestamp for the row in the table T. A subsequent process—in particular a query process as discussed above—may set the delete timestamp value of the row in the table T to the create time of the corresponding row of table $T_{del}$.

According to another embodiment of the method, a reorganization of the table may comprise performing a query of the table. This way, a deletion of the rows corresponding to rows in the table $T_{del}$ may be performed automatically. No further action may be required in order to delete the row in table T which may have been deleted logically already before by creating a corresponding row in table $T_{del}$.

According to another embodiment of the method, a correspondence between the rows in the dedicated table and the table may be established by using all those rows in the table in which the create timestamp value is smaller than the create timestamp value in the corresponding dedicated table. This may ensure that a deletion and recreation of a row in a table T may find the right "old" row to be deleted.

According to a further embodiment of the method, deleting one of the rows in the table may be performed by setting the delete timestamp value of the row and the corresponding row of the dedicated table to the create timestamp value of the corresponding row of the dedicated table. Thus, all three corresponding timestamps may be equal: the delete timestamp of the row in table T, the create timestamp of the corresponding row in table $T_{del}$, as well as the delete timestamp in table $T_{del}$. Alternatively, the delete timestamp of table $T_{del}$ may be set "−1" or any other "impossible" value that may not be set under normal operations in order that such a row is not read again under normal operational conditions of the database.

According to one embodiment of the method, an update operation of a row in the table may be performed as an insert operation only in the table—in particular without searching for the row and inserting its key into the dedicated table, if a primary key of the row and an existence of the row in the table is known a priori. Thus, if the database system may know without doubt that the row in table T exists, i.e., including its keys, then no computation-wise expensive search for the row is required; an update in a simplified form may be performed by only appending the new row which relates to the row to be modified and an additional row on the table $T_{del}$ corresponding to the "old" row in table T. This may speed up the update process for rows in table T.

According to another embodiment of the method, in case multiple parallel queries are executed, a first query out of the multiple parallel queries may delete, from a portion of the table, the row corresponding to the row in the dedicated table by marking the portion of the table as locked for writes. The portion of the table may comprise, e.g., a database page or also a complete database table. Thus, multiple queries may perform the delete operation for different part of a table. Thus, a clean-up of only logically deleted row in the table T may be performed faster.

In the following, a detailed description of the figures will be given. All instructions in the figures are schematic. Firstly, a block diagram of an embodiment of the method for deleting rows from tables in a database system is given. Afterwards, further embodiments as well as embodiments of the database system will be described.

FIG. 1 shows a block diagram of an embodiment of the method for deleting rows from tables in a database system. The method 100 comprises logically deleting, at block 102, the row in the table T in the database system by inserting its key into a dedicated table $T_{del}$ in the database system. The logical deletion may correspond to a regular delete operation in a table and which may replace such a regular deletion operation.

At block 104, the dedicated table $T_{del}$ is also queried during a query against the table T. At block 106, during one or more subsequent queries, the row or plurality of rows corresponding to row(s) in the dedicated table are deleted as a part of the query processing. For example, a delete timestamp value of the row or plurality of rows in the table is set equal to the create timestamp value of the row or plurality of rows in the dedicated table $T_{del}$.

Figure 2:
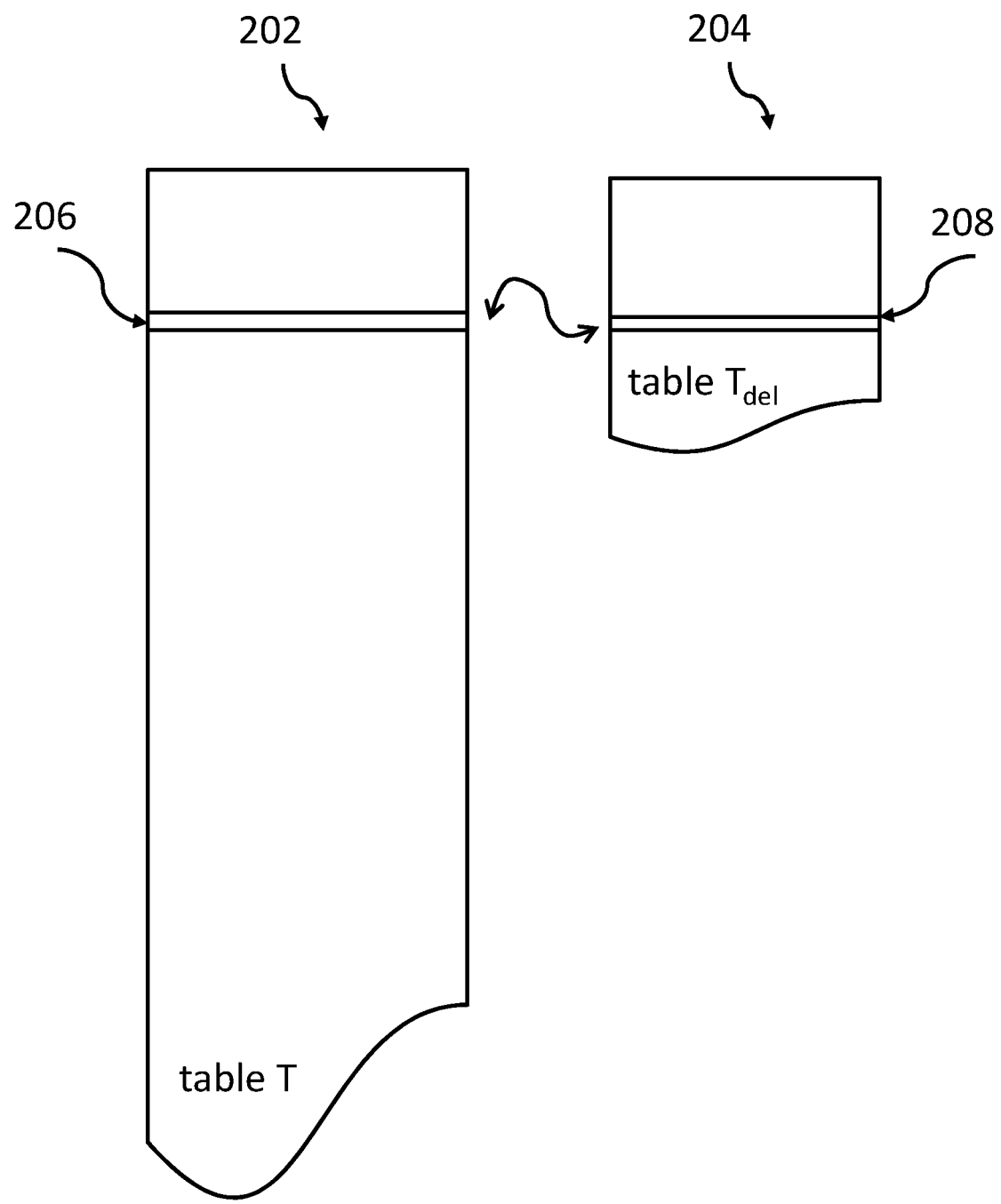
FIG. 2 shows a block diagram of an example of two corresponding tables T and Tdel of a database system.

FIG. 2 shows a block diagram of two corresponding tables T and $T_{del}$ of a database system. In this embodiment, the table T 202 is a large table with many row entries and no index is available. However, table T may have a defined key comprising one or more attributes in some embodiments. In particular, table T may comprise a unique primary key for each row. Alternatively, a unique primary key may be a combination of several secondary keys. A skilled person will understand that secondary key may—per definition—be non-unique keys.

The dedicated table $T_{del}$ 204 may comprise rows 208 corresponding to an individual row 206 of table T 202 (the correspondence is shown as a double arrow). Each row 208 in the table $T_{del}$ 204 may correspond to a logically deleted row 206 in table T 202.

In other words, as observed above, deleting individual rows may be computationally expensive in the tables 202 without an index. However, inserting new rows in a table may not be as expensive in the sense of computing intensity. Thus, rather than actually deleting individual rows from the table T 202, a respective key is inserted into a dedicated table $T_{del}$ 204. To reflect the effect of the delete, subsequent queries to the table T 202 delete rows 206 from the result of the queries that correspond to a respective key inserted into the dedicated table $T_{del}$.

This way, the delete statement is as fast as adding a row to a table. On the other hand, queries are slowed down because of the additional check whether a row has been deleted. This check must be done for every row in table T 202, in some embodiments, provided the dedicated table $T_{del}$ 204 is not empty. This approach is capable of accelerating delete statements. However, as the dedicated table $T_{del}$ 204 grows, the queries are increasingly slowed down. Thus, it is desirable to actually delete the rows from the table at some point in time. To actually delete the rows from the table T 202 one of the queries which has scanned a row deletes the row and also deletes a corresponding row in the dedicated table $T_{del}$ 204 by setting corresponding delete timestamps. Thus, such a query does not only delete the row from the query's result. It also interacts with a record management system of the database system to perform the actual deletion, now that the location of the row is known.

Subsequently, any query may also ensure that the respective row is deleted from the dedicated table $T_{del}$ 204 by setting a respective delete timestamp value.

Thus, whereas a delete statement in conventional systems requires a table scan to find the location of a row, in the illustrative method and system described herein actual deletion of the row is postponed until a query scans the table T 202 during performance of other operations. As a result, the delete statement is faster in the embodiments described herein at the price of the subsequent query being slowed down a little. However, the combined execution time of a deletion and a subsequent query is still considerably faster than in conventional systems. Moreover, when the dedicated table $T_{del}$ is empty—that is, the dedicated table only has entries with set delete timestamps—the subsequent queries may run as usual.

Details of implementation of the techniques described herein may vary based on the concurrency control method employed by the database, e.g. analytical database. For example, two example approaches are multi-version concurrency control (MVCC) and lock-based concurrency control. For purposes of explanation, some of the embodiments are described herein with respect to MVCC. However, the techniques described herein are also applicable lock-based implementations.

Without loss of generality, it may be assumed that every row in table T 204 may be uniquely identified by its key columns $k_1 \ldots k_n$. If no such key columns exist, an artificial key column may be generated. In some embodiments, the generated key column is the same across all databases that may potentially be synchronized and does not change during the life time of a row. In addition to the key columns, the table T 204 may have auxiliary non-key columns $a_1 \ldots a_m$. A combination of the key columns may define a primary key.

An example of a table T 204 with a create timestamp and a delete timestamp for an MVCC system may be as follows:

TABLE 1

| row | CreateTimeStamp | DeleteTimeStamp |
|-----|-----------------|-----------------|
| A   | Transaction 1   | Transaction 2   |
| B   | Transaction 1   | Transaction 4   |
| C   | Transaction 3   | —               |

Systems implementing MVCC may allow multiple versions of the same row to exist in a table. Moreover, every row may carry a logical create timestamp and a logical delete timestamp. The timestamps are usually transaction numbers and assumed to grow monotonically. Every transaction only sees those rows which have their respective create timestamp before the transaction's number and their respective delete timestamp after it, or no delete timestamp at all.

Table 1 above shows such an example. Transaction #1 sees rows A and B as transaction #1 sets a create timestamp for rows A and B. Transaction #2, which sets a delete timestamp for row A, also sees rows A and B. Transaction #3, however, which sets a create timestamp for row C, is able to see row B, but not row A as row A had a delete timestamp set prior to transaction #3.

Processing delete operations according to the embodiments described herein involves simulating delete operations by inserting deleted rows into a dedicated table $T_{del}$ 204. Queries reading rows from a table T 202 check the corresponding dedicated table $T_{del}$ 204 for rows they have read but which they are to ignore in their query result. For an MVCC-based implementation, the dedicated table $T_{del}$ 204 for table T 202 consists of table T's 202 key columns $k_1, \ldots, k_n$. As with all tables in an MVCC-based database, the dedicated table 204 also includes a create and a delete timestamp attribute of its own rows. The create timestamp of the row in table $T_{del}$ 204 holds the transaction number of the transaction that issued the delete operation. It may be noted that the create timestamp value of any row in table $T_{del}$ 204 equals the delete timestamp value which the delete operation would have assigned to all rows it affects if it had deleted the rows directly.

An update operation may be implemented as a deletion operation followed by an insert operation in the same table T 202. In MVCC-based systems, the old version of the updated rows remains in the table T 202 for older transactions that are still running. The proposed approach to implement update operations in MVCC is to insert the new version of the row directly into table T 202. Table T 204 then may contain two versions of the same row with no delete timestamp value, i.e., both rows are valid in table T 202, but with different create timestamp values. In addition to that, the key columns of the old version of the row are inserted into the dedicated table $T_{del}$ 204, just as described above for a delete operation.

It may be noted that the update operation may have modified the key columns of the row. In this case, the old key columns of the row must be known to carry out the update operation. Thus, in such embodiments, only update operations are permitted that either (a) do not change the key columns or (b) include all old key column values in their search condition using equi-predicates, as in the update statement in the example below. In the presented scenario of synchronizing the changes made in the operational database to the analytical database, the old key column values are typically included in the search condition. To illustrate an update operation, assume table T 202 contains the rows (A, 1, a, b) and (B, 2, c, d), as shown in table 2 below. The rows carry the create timestamp value 1 and no delete timestamp value. Now transaction #2 executes the following UPDATE operation:

UPDATE T SET $k_2$=3, $a_1$='e', $a_2$='f'
WHERE $k_1$='A' AND $k_2$=1

This means that the system must delete the old row (A, 1, a, b) from table T 202 and insert the new row (A, 3, e, f) in this example.

The new row is inserted directly with little to no delay into the table T 202 (shown underlined in table 3). Its create timestamp value is 2. The old row remains in table T 202. The old row is unmodified and still carries no delete timestamp value. To mark the old row as deleted, transaction #2 inserts the old key columns into the dedicated table $T_{del}$ 204, as shown in table 3 below. The new row in dedicated table $T_{del}$ 204 itself has created timestamp 2.

Table 2 representing table T 202:

| $k_1$ | $k_2$ | $a_1$ | $a_2$ | CreateTimeStamp | DeleteTimeStamp |
|---|---|---|---|---|---|
| A | 1 | a | b | 1 | — |
| B | 2 | c | d | 1 | — |
| <u>A</u> | <u>3</u> | <u>e</u> | <u>f</u> | <u>2</u> | <u>—</u> |

Table 3 representing table $T_{del}$ 204 of table T 202:

| $k_1$ | $k_2$ | CreateTimeStamp | DeleteTimeStamp |
|---|---|---|---|
| A | 1 | 2 | — |

The shown row logically deleted the old version of the updated row in table T 202.

The above discussion relates to how deletes (and the delete parts of updates) may be accelerated by simply inserting the keys of deleted rows in the dedicated table $T_{del}$. This means that subsequent queries read the dedicated table $T_{del}$ and exclude rows from the query result that have a corresponding row in the table $T_{del}$. It may be noted that this principle applies both to MVCC and lock-based concurrency control. The implementation, however, may differ. For purposes of explanation, an MVCC implementation is discussed herein.

To determine whether a row from table T 202 has logically been deleted, a query that reads table T 202 also checks the dedicated table $T_{del}$. For this purpose, the query retrieves all key columns of table T 202, even if it does not need their values for the query result. In addition, the query retrieves the create timestamp column value from table T 202. It is to be understood that only the version of the row which existed at the time of the delete operation is excluded from the query result. All later versions remain, no matter whether they were introduced by updates or inserts.

This may be achieved by comparing the create timestamp value from table T 202 with the corresponding create timestamp value from the dedicated table $T_{del}$. An SQL query statement showing only the rows from table T 202 that are still valid may be as follows:

```
SELECT *
FROM T
WHERE NOT EXISTS (
    SELECT 1
    FROM T_del
    WHERE (T.k_1, ..., T.k_n) = (T_del.k_1, ..., T_del.k_n)
    AND T.CreateTimeStamp < T_del.CreateTimeStamp )
```

Figure 3:
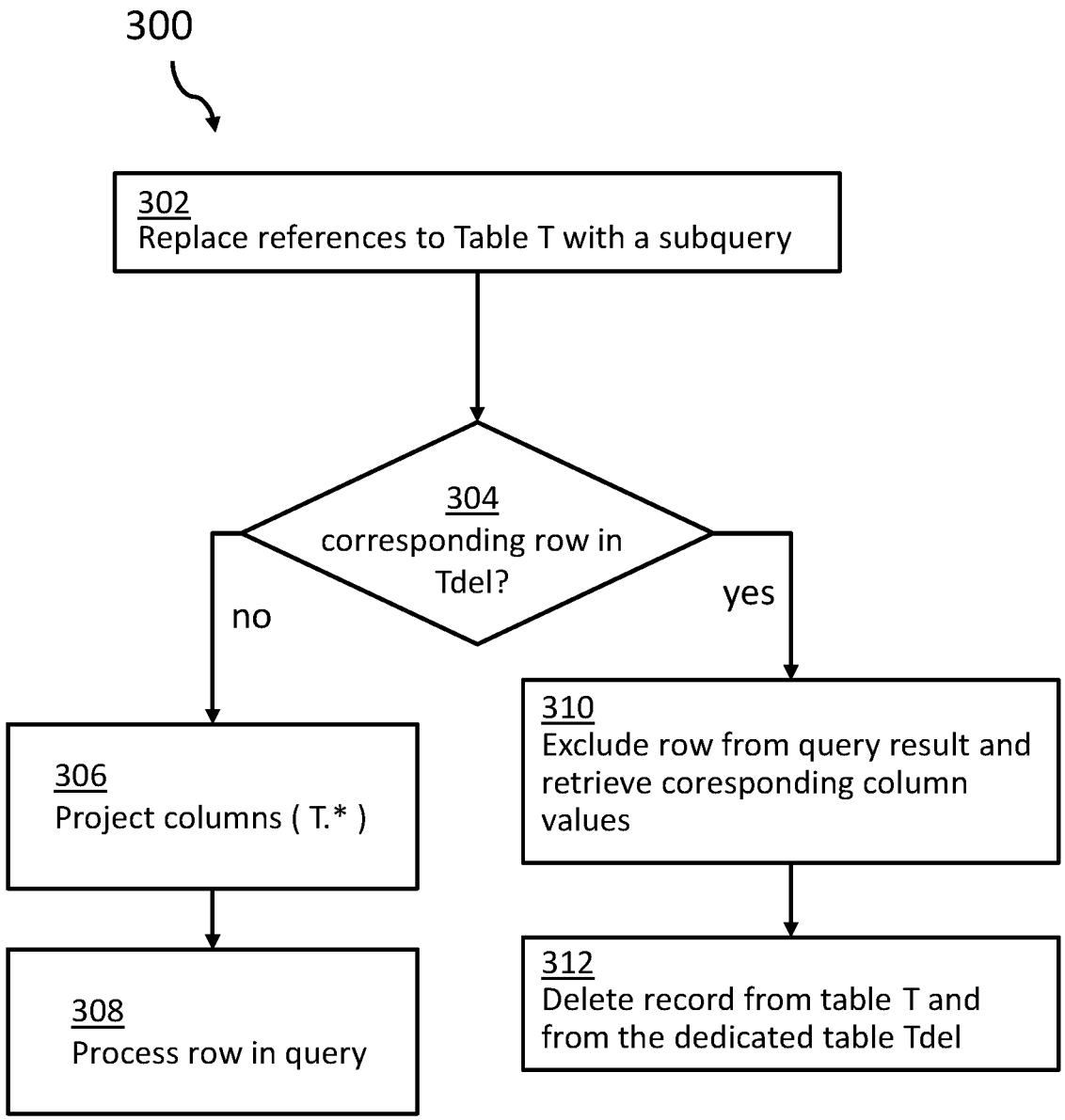
FIG. 3 shows a flow diagram of an embodiment of how deleting a row may be performed.

FIG. 3 shows a flow diagram of one embodiment of a method 300 of deleting a row. In addition to removing the rows that have logically been deleted from intermediate query results, it would be desirable to actually delete them from table T 202 as soon as possible. One advantage of not deleting a row immediately in a delete or update operation, as described herein, is reduced computation expense since the location of the rows is computationally expensive to find. In particular, to actually delete the row in a conventional MVCC, for example, by setting the delete timestamp value, the location of the row is required. However, in the embodiments described herein, when a query reads rows from a table it is relatively easy to also obtain the location from which the rows were read. For example, most database systems offer a virtual column that contains the location. The query retrieves this column in addition to the other required columns for the operation being performed. In particular, the query retrieves the keys that are used with the dedicated table $T_{del}$.

To actually delete the rows, a query which has detected a logically deleted row (as described above) does not simply ignore the row. In addition to removing the logically deleted row from the query result, the query forwards the row's location to the record management system in order to have it deleted from table T 204, such as by setting a delete timestamp value.

To achieve this, the query replaces all its references to table T 202 with a subquery, such as the following example SQL statement, at block 302. It is to be understood that the subquery below is provided for purposes of illustration only and is not intended to be limiting.

```
SELECT
    T.*,
    T.RecordLocation,
    T_del.CreateTimeStamp,
    T_del.RecordLocation
FROM T
LEFT OUTER JOIN T_del
    ON (T.k_1, . . . , T.k_n) = (T_del.k_1, . . ., T_del.k_n)
    AND T.CreateTimeStamp < T_del.CreateTimeStamp
```

This subquery may select all rows of table T 202. In addition, it adds the row or record location of the row in table T 202 and, if the corresponding row in $T_{del}$ 204 exists, its create timestamp and its record location in the dedicated table $T_{del}$ 204. If the row has logically been deleted, then the create timestamp value from $T_{del}$ is the delete timestamp value to set for the row in table T 202. The $T_{del}$.CreateTimeStamp column acts as an indicator based on which the query determines the next execution step.

It is determined, at block 304, if a row does not exist in dedicated table $T_{del}$ 204 for a row in table T 202. For example, if the CreateTimeStamp column of $T_{del}$ 204 delivers NULL for a corresponding row in table T 202, the row in T is valid (i.e. not logically deleted) and is included in the subquery result. If the row does not exist in the dedicated table $T_{del}$, the columns T.* are projected at block 306. That is, the dedicate table $T_{del}$ 204 columns of the query are ignored and the row in the query is further processed at block 308 according to the operation of the query.

If it is determined at block 304 that a row does exist in the dedicated table $T_{del}$ (i.e. the $T_{del}$.CreateTimeStamp contains a value), the row is not included in the query result and the query retrieves the corresponding column values at block 310. For example, in this embodiment the query retrieves the column values T.RecordLocation, $T_{del}$.CreateTimeStamp and $T_{del}$.DeleteRecordLocation. These column values are used to actually delete the row from table T 202 and the corresponding "delete" row from $T_{del}$ 204 at block 312. For example, the DeleteTimeStamp value of the row in table T is set to the time of the deletion of the row which is manifested in the CreateTimeStamp value of the corresponding row in the dedicated table $T_{del}$ 204.

Similarly, the corresponding row in the dedicated table $T_{del}$ 204 is deleted by setting the DeleteTimeStamp value to the CreateTimeStamp value of the row in the dedicated table $T_{del}$ 204. Hence, all three attributes have the same value. That is, the DeleteTimeStamp of the row in table T 202, CreateTimeStamp of the corresponding row—e.g., having the same key values—in dedicated table $T_{del}$ 204, and DeleteTimeStamp of the corresponding row in dedicated table $T_{del}$ 204 have the same value.

Using the value in the T.RecordLocation column, the record management system is able to directly delete the row. However, the row is not deleted using the transaction number of the query. Instead, the value in the $T_{del}$.CreateTimeStamp column is used, which contains the transaction number of the delete operation. Thus, the record management system simply writes this value into the row's delete timestamp column in table T 202.

Thus, after the record management system has successfully deleted the row from table T 202, the corresponding row in dedicated table $T_{del}$ 204 is no longer needed. Using the $T_{del}$.DeleteRecordLocation column, the record management system is equally able to delete it from dedicated table $T_{del}$ 204. Again, the transaction number contained in the $T_{del}$.CreateTimeStamp column is used. Consequently, every row in dedicated table $T_{del}$ 204, in this example, has two possible different values. In particular, either the delete timestamp value is not set, in which case the delete row is still valid, or the delete timestamp value equals its create timestamp, which means that the row has been deleted from dedicated table $T_{del}$ 204.

Hence, FIG. 3 sketches the processing of a query that includes table T 202. As described, it joins table T 202 with the dedicated table $T_{del}$ 204. Depending on whether a corresponding delete-row exists in dedicated table $T_{del}$ 204 or not, the query ignores the current row of table T 202 and deletes both the row from table T 202 and the "delete-row" from table $T_{del}$ 204, or the query includes the row in the query result and processes it further according to the respective query operation.

Figure 4:
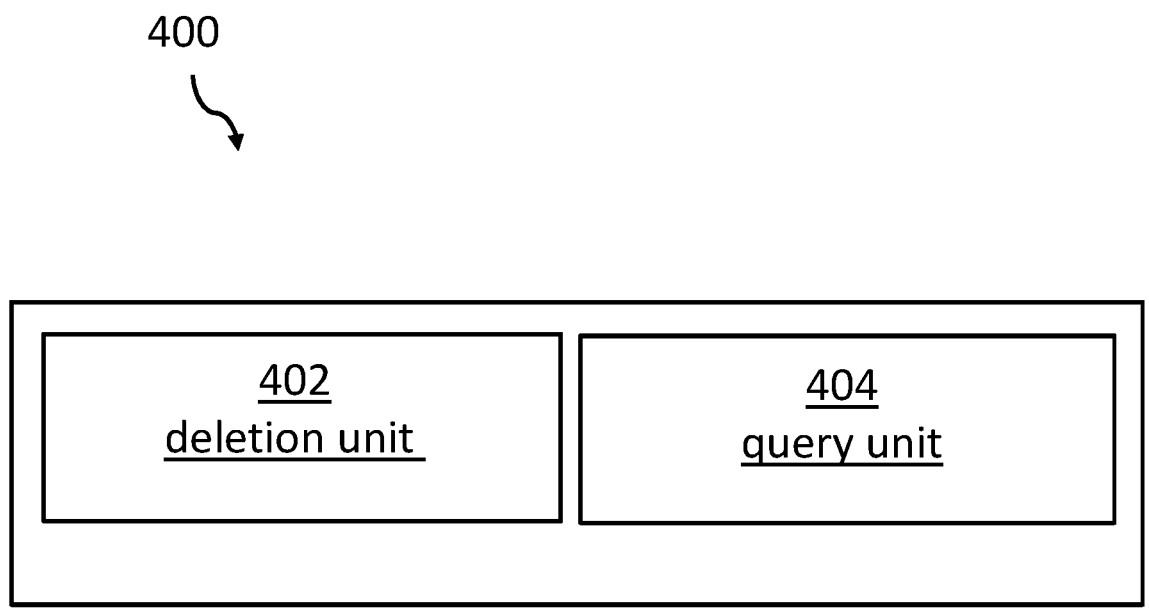
FIG. 4 shows an illustrative embodiment of the database system.

FIG. 4 shows an embodiment of a related database system 400. A database system 400 comprises a deletion unit 402 configured to logically delete the row in the table 202 in the database system 400 by inserting its key into a dedicated table $T_{del}$ 204 in the database system 400 as described above. The database system 400 also includes a query unit 404 configured to query the dedicated table during a query against the table T 202. The deletion unit 402 is also configured to delete, during subsequent queries, the row from the table T 202 corresponding to the row in the dedicated table $T_{del}$ 204 along with deleting the corresponding row in the dedicated table $T_{del}$ 204 as a part of query processing. The deletion unit 402 and the query unit 404 can be implemented using a processor executing software instructions and/or via hardware components such as semiconductor devices, chips, logical gates, circuits, circuit cards, and/or other physical hardware devices (e.g., ASIC or FPGA).

It may be noted that a deletion may imply a setting of a delete timestamp, which may be an attribute of every row in every table of a database system. In particular, in some embodiments implementing MVCC systems this mechanism is used.

Figure 5:
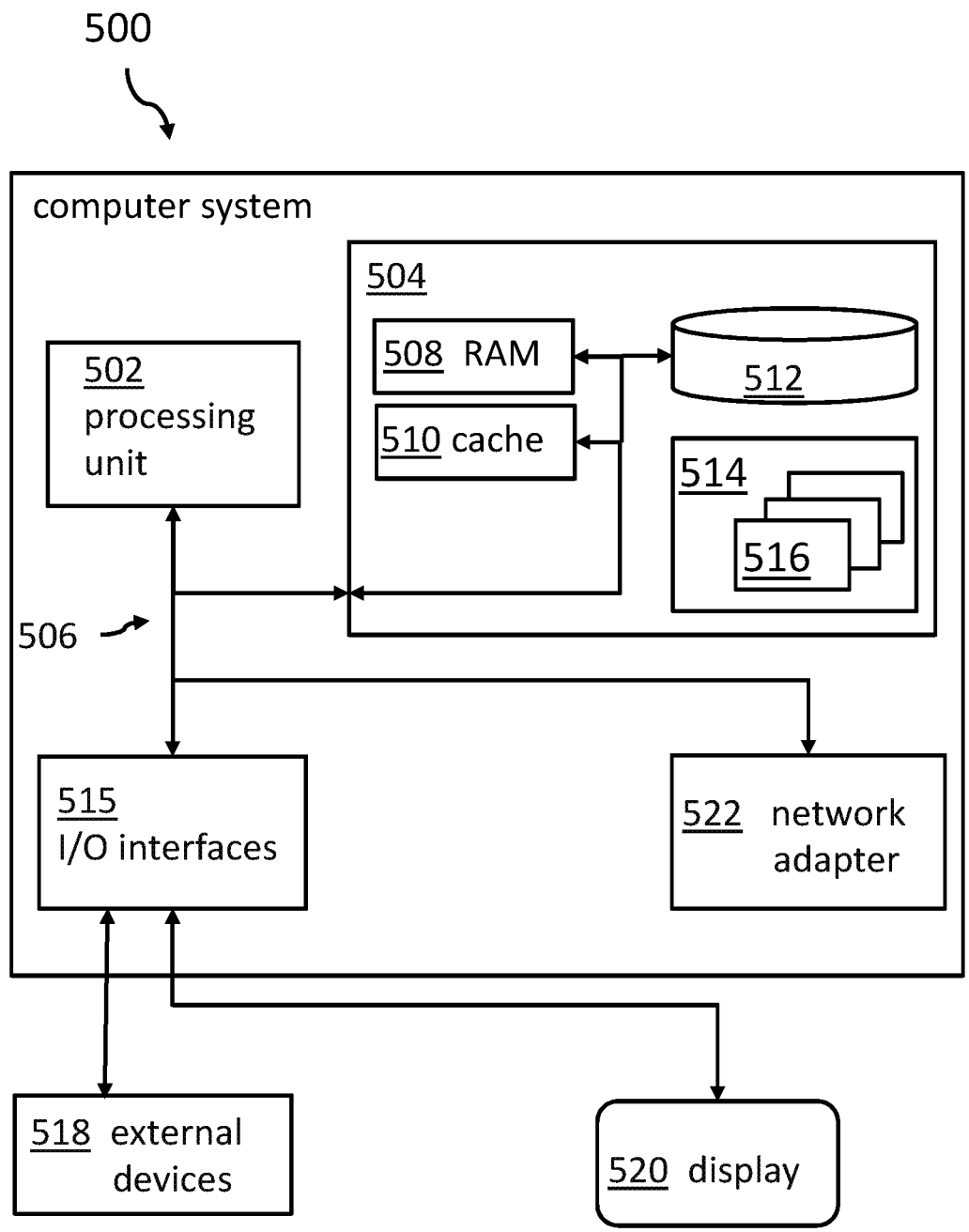
FIG. 5 shows an embodiment of a computing system comprising the database system.

FIG. 5 shows an embodiment of a computing system 500 comprising the database system.

The embodiments described herein may be implemented together with virtually any type of computer, regardless of the platform being suitable for storing and/or executing program code. FIG. 5 shows, as an example, a computing system 500 suitable for executing program code related to the proposed method.

The computing system 500 is one example of a suitable computer system and is not intended to suggest any limitation as to the scope of use or functionality of the embodiments described herein. Computer system 500 is configured to perform the functionality set forth herein. The components in the computer system 500 are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

In the example of FIG. 5, the components of computer system/server 500 include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments described herein.

Program/utility 514, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of deleting rows in a table as described herein with respect to FIGS. 1-4.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 515. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

The descriptions of the various embodiments have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or another devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the embodiments has been presented for purposes of illustration and description, but is not intended to be exhaustive or limited to the embodiments in the form disclosed. Many modifications and variations will be apparent to those of ordinary skills in the art without departing from the scope and spirit of the invention. The embodiments are chosen and described in order to best explain the principles and the practical application, and to enable others of ordinary skills in the art to understand the invention for various embodiments with various modifications, as are suited to the particular use contemplated.

What is claimed is:

1. A method for deleting a first row from a first table in a database system, said method comprising:
   logically deleting the first row in the first table in the database system by inserting a key of the first row into a corresponding row of a dedicated table in the database system and setting a create timestamp attribute of the corresponding row in the dedicated table to a delete timestamp value of a delete operation for the first row;
   querying the dedicated table during a query against the first table to identify the corresponding row in the dedicated table; and
   in response to identifying the corresponding row in the dedicated table, deleting the first row from the first table and the corresponding row from the dedicated table as part of query processing during a subsequent query;
   wherein deleting the first row in the first table and the corresponding row in the dedicated table comprises setting a delete timestamp attribute of the first row and a delete timestamp attribute of the corresponding row of the dedicated table to the delete timestamp value in the create timestamp attribute of the corresponding row of the dedicated table.

2. The method according to claim 1, wherein the first table does not have an index.

3. The method according to claim 1, further comprising inserting a modified first row in the first table.

4. The method according to claim 1, establishing a correspondence between rows in the dedicated table and rows in the first table by using all rows in the first table in which the create timestamp value is smaller than the create timestamp value in rows of the corresponding dedicated table.

5. The method according to claim 1, further comprising performing a query of the first table during a reorganization of the first table.

6. The method of claim 1, wherein querying the dedicated table during a query against the first table further comprises:
   reading the first row from the first table; and
   in response to determining that the corresponding row in the dedicated table has the create timestamp value set to the delete timestamp value of the delete operation and that the delete timestamp attribute of the corresponding row is null, excluding the first row from results of the query against the first table.

* * * * *